US008250864B2

(12) United States Patent
Pott et al.

(10) Patent No.: US 8,250,864 B2
(45) Date of Patent: Aug. 28, 2012

(54) METHOD FOR CONTROLLING THE TORQUE OF A HYBRID DRIVE UNIT AND HYBRID DRIVE UNIT

(75) Inventors: Ekkehard Pott, Gifhorn (DE); Matthias Holz, Lehre (DE); Michael Zillmer, Sickte (DE); David Prochazka, Libosovice (CZ)

(73) Assignee: Volkswagen AG, Wolfsburg (DE)

( * ) Notice: Subject to any disclaimer, the term of this patent is extended or adjusted under 35 U.S.C. 154(b) by 586 days.

(21) Appl. No.: 11/789,991

(22) Filed: Apr. 25, 2007

(65) Prior Publication Data
US 2007/0278021 A1 Dec. 6, 2007

(30) Foreign Application Priority Data
Apr. 25, 2006 (DE) .......................... 10 2006 019 031

(51) Int. Cl.
*F02D 23/00* (2006.01)
*B60K 1/00* (2006.01)
*B60K 6/20* (2007.10)
*B60K 6/485* (2007.10)
*B60W 10/00* (2006.01)
*B60W 10/06* (2006.01)
*B60W 20/00* (2006.01)
*B60W 10/04* (2006.01)
*B60W 10/24* (2006.01)

(52) U.S. Cl. ... 60/601; 180/65.1; 180/65.21; 180/65.26; 180/65.265; 180/65.28; 180/65.285; 180/65.29

(58) Field of Classification Search .................... 60/601; 180/65.1, 65.21, 65.26, 65.265, 65.27, 65.275, 180/65.28, 65.29
See application file for complete search history.

(56) References Cited

U.S. PATENT DOCUMENTS

| 4,407,132 | A | | 10/1983 | Kawakatsu et al. | |
|---|---|---|---|---|---|
| 5,881,559 | A | * | 3/1999 | Kawamura | 60/597 |
| 6,116,368 | A | | 9/2000 | Lyons et al. | |
| 6,209,672 | B1 | * | 4/2001 | Severinsky | 180/65.23 |
| 6,338,391 | B1 | * | 1/2002 | Severinsky et al. | 180/65.23 |
| 6,554,088 | B2 | * | 4/2003 | Severinsky et al. | 180/65.23 |
| 6,581,707 | B2 | * | 6/2003 | Morimoto et al. | 180/65.26 |
| 6,659,213 | B2 | * | 12/2003 | Kubo et al. | 180/65.26 |
| 6,691,807 | B1 | * | 2/2004 | Bhavsar et al. | 180/65.21 |
| 6,740,987 | B2 | * | 5/2004 | Kitajima et al. | 290/40 C |
| 6,809,429 | B1 | * | 10/2004 | Frank | 290/40 C |

(Continued)

FOREIGN PATENT DOCUMENTS
DE 44 22 647 1/1996
(Continued)

*Primary Examiner* — Thomas Denion
*Assistant Examiner* — Cameron Setayesh
(74) *Attorney, Agent, or Firm* — Kenyon & Kenyon LLP

(57) ABSTRACT

A method is for controlling the torque of a hybrid drive unit, which includes a combustion engine and at least one electric machine capable of being operated alternatively as a motor or as a generator. The electric machine, when operated as a motor, is powered by an energy storage device and supplies a positive electric motor torque which together with a combustion engine torque of the combustion engine produces a total drive torque of the hybrid drive unit. A hybrid drive unit includes a respective torque control. In the event that a desired torque is greater than a consumption-optimized combustion engine maximum torque, the electric machine is operated as a motor having an electric motor torque. An electric motor maximum torque is specified as a function of at least one state parameter of the energy storage device.

14 Claims, 2 Drawing Sheets

U.S. PATENT DOCUMENTS

| | | | |
|---|---|---|---|
| 6,847,189 B2 * | 1/2005 | Frank ............................. | 320/104 |
| 6,879,888 B2 * | 4/2005 | Ochiai et al. .................... | 701/22 |
| 6,931,850 B2 * | 8/2005 | Frank et al. ..................... | 60/608 |
| 6,943,460 B2 * | 9/2005 | Wakashiro et al. .......... | 290/40 C |
| 6,986,335 B2 * | 1/2006 | Sieber et al. .................. | 123/320 |
| 6,986,399 B2 * | 1/2006 | Bhavsar et al. ............ | 180/65.21 |
| 6,988,572 B2 * | 1/2006 | Tatara et al. ............... | 180/65.26 |
| 7,028,793 B2 * | 4/2006 | Hu et al. .................... | 180/65.25 |
| 7,074,157 B2 * | 7/2006 | Wakashiro et al. ................ | 477/7 |
| 7,076,954 B1 * | 7/2006 | Sopko et al. .................... | 60/607 |
| 7,104,347 B2 * | 9/2006 | Severinsky et al. ........ | 180/65.23 |
| 7,237,634 B2 * | 7/2007 | Severinsky et al. ........ | 180/65.23 |
| 7,276,806 B1 * | 10/2007 | Sheidler et al. ............. | 290/40 A |
| 7,392,871 B2 * | 7/2008 | Severinsky et al. ........ | 180/65.28 |
| 7,446,426 B2 * | 11/2008 | Sheidler et al. ............. | 290/40 A |
| 7,455,134 B2 * | 11/2008 | Severinsky et al. ........ | 180/65.28 |
| 7,520,353 B2 * | 4/2009 | Severinsky et al. .......... | 180/65.8 |
| 7,792,628 B2 * | 9/2010 | Aswani et al. ................ | 701/103 |
| 2003/0217876 A1 * | 11/2003 | Severinsky et al. .......... | 180/65.2 |
| 2005/0126836 A1 * | 6/2005 | Bischoff ...................... | 180/65.2 |
| 2007/0023212 A1 * | 2/2007 | Griesmeier et al. ......... | 180/65.2 |
| 2007/0125083 A1 * | 6/2007 | Rollinger et al. ............ | 60/605.1 |

FOREIGN PATENT DOCUMENTS

| | | |
|---|---|---|
| DE | 100 43 724 | 3/2001 |
| DE | 103 60 440 | 7/2004 |
| DE | 698 21 588 | 12/2004 |

* cited by examiner

METHOD FOR CONTROLLING THE TORQUE OF A HYBRID DRIVE UNIT AND HYBRID DRIVE UNIT

CROSS-REFERENCE TO RELATED APPLICATIONS

The present application claims priority to Application No. 10 2006 019 031.9, filed in the Federal Republic of Germany on Apr. 25, 2006, which is expressly incorporated herein in its entirety by reference thereto.

FIELD OF THE INVENTION

The present invention relates to a method for controlling the torque of a hybrid drive unit, e.g., for a motor vehicle, and a corresponding hybrid drive unit.

BACKGROUND INFORMATION

A hybrid drive unit includes a combustion engine as well as at least one electric machine capable of being operated alternatively as a motor or as a generator. When operated as a motor, the electric machine is powered by an energy storage device and supplies a positive electric motor torque, which together with a combustion engine torque of the combustion engine represents a total drive torque of the hybrid drive unit.

Hybrid vehicles refer to motor vehicles, in which at least two drive sources, which access different energy sources, are combined in order to provide the power for driving the vehicle. The characteristics of a combustion engine, which generates kinetic energy by burning gasoline or diesel fuels, and an electric machine, which converts electric energy into kinetic energy, complement each other. For this reason, current hybrid vehicles are predominantly equipped with a combination of combustion engine and one or multiple electric machines. It is possible to distinguish two different hybrid concepts. In so-called serial hybrid concepts, the vehicle is driven exclusively by the electric machine, while the combustion engine generates, via a separate generator, the electric current for charging an energy storage device that powers the e-machine or for powering the e-machine directly. By contrast, currently, at least in passenger car applications, parallel hybrid concepts are preferred, in which the vehicle may be driven both by the combustion engine and by the e-machine.

Example embodiments of the present invention relate particularly to such parallel arrangements.

The electric machines used in such parallel arrangements may be operated alternatively as a motor or as a generator. In combustion engine propulsion, the e-machine is operated predominantly as a generator, an electric power of the e-machine thus generated being used, for example, to charge the energy storage device and/or to supply a vehicle electrical system. In the case of a power-distributed hybrid arrangement having more than one e-machine, the operation of an e-machine as a generator may also be used to power another. Furthermore, normally at least a part of a braking power is raised by the e-machine operated as a generator (recuperation), a part of the mechanical energy loss being converted into electrical energy. By contrast, when operated as a motor, the e-machine is typically switched on at operating points having higher vehicle loads to support the combustion engine (boost function), e.g., the combustion engine torque and the electric motor torque are added together. In addition, the e-machine may take on the function of a starter motor for the combustion engine. In addition, power-distributed hybrid arrangements are used as well, in which two e-machines and the combustion engine are coupled via a planetary wheel gear and the power flow may also be divided into to electrical and mechanical power. In hybrid arrangements, it is considered advantageous that the e-machines work more efficiently than conventional claw pole generators.

Especially in single-shaft parallel hybrids, the e-machine is normally switched on for support in order to improve the driving performance when engine speeds are low and the driver at the same time makes a high load demand. At high rotational speeds, by contrast, usually no power addition is performed so as not to exhaust the energy storage device and in order to achieve a reproducible vehicle performance independently of the charge state of the energy storage device. Combustion engines having charge-air superchargers, e.g., turbochargers or compressors, normally have a very low specific torque (unit $Nm/dm^3$ displacement) at low rotational speeds, e.g., below 2,000 rpm, whereas high specific torques are achieved in the medium and high rotational speed range. This effect is also referred to as turbo lag. The use of the e-machine as a motor is also used for the purpose of smoothing out this turbo lag. In contrast to naturally aspirated engines, only a low electromotive torque support is required for a harmonic torque characteristic at rotational speeds far above 2,000 rpm.

In supercharged combustion engines, but also in naturally aspirated engines, it is believed to be problematic that the energy storage devices of the electric machines do not provide a uniform charging and discharging capacity across all state ranges. For example, a low charge state (SOC, for state of charge) or an aging (SOH, for state of health) of the energy storage device results in markedly reduced discharging capacities in supplying the electric machine for its operation as a motor. At high load demands, e.g., in the medium rotational speed range, this results in a poorly reproducible total torque and driving performance of the hybrid vehicle.

Example embodiments of the present invention provide a control system for coordinating the torques of the combustion engine and the e-machine, which may provide maximum driving performances, e.g., a maximum torque, while offering the highest possible reproducibility at the lowest possible fuel consumption. Furthermore, a suitable torque control system is to be provided for implementing the method.

In the event that a desired torque is greater than a combustion engine maximum torque, which is optimized for low fuel consumption, the method provides—at least within predetermined rotational speed ranges—for the electric machine to be operated in a supportive manner as a motor having a positive electric motor torque. This means that it is only when a desired torque is demanded by the driver, which exceeds the consumption-optimized maximum torque of the combustion engine, that the electric machine is switched on to produce the high total drive torque. In this context, consumption-optimized combustion engine maximum torque signifies a normally not to be exceeded maximum torque, which may be produced by the combustion engine when this is operated as a function of a current load point having operating parameters (such as ignition point, injection parameters, e.g., also air ratio and others, etc.) that are optimized for a highest-possible efficiency and thus a low fuel consumption. Example embodiments of the present invention may provide for specifying a electric motor maximum torque of the electric machine that is not to be exceeded as a function of at least one state parameter of the energy storage device powering the electric machine. In this manner, a variable electric motor maximum torque is produced, which is adjusted to a current energy storage device state.

Example embodiments of the present invention provide for a maximum total drive torque of the hybrid drive unit, e.g., the maximum total torque to be produced by the sum of the electric motor torque and the combustion engine torque, to be configured, at least in a predetermined rotational speed range, substantially for a consumption-independent combustion engine maximum torque of the combustion engine. In contrast to the consumption-optimized torque, the consumption-independent (or consumption-ignoring) combustion engine maximum torque corresponds to a maximum torque producible by the combustion engine alone without regard to an increased fuel consumption. For example, the maximum total drive torque of the hybrid drive unit is preset, e.g., to at least 90%, e.g., to at least 95% of the consumption-independent combustion engine maximum torque. At least in the predetermined rotational speed range, this results in a differential torque between the consumption-optimized and the consumption-independent combustion engine maximum torque, which is produced as a function of the state of the energy storage device either by the electric machine (when the energy storage device state is optimal) or by the combustion engine (when the energy storage device is in the worst possible state). In intermediary states of the energy storage device, this differential torque is produced by an appropriate combination of electric motor torque and combustion engine torque. In this manner, a constant maximum total torque and thus a very reproducible vehicle performance may always be ensured. The specified rotational speed range may correspond to rotational speeds above 1,600 rpm, e.g., above 1,800 rpm, e.g., above 2,000 rpm. In supercharged engines, e.g., the so-called turbo lag is substantially completely compensated by an electric motor torque below the specified rotational speed threshold.

A possible state parameter of the energy storage device may be any variable that influences a charging and/or discharging capacity of the energy storage device. In this instance, there is a provision that, if the at least one state parameter corresponds to a decreasing charging and/or discharging capacity, then the specified electric motor maximum torque of the electric machine is lowered accordingly. Such suitable state parameters include a charge state (SOC), an aging state (SOH), an energy storage device temperature (TE) and/or a structure-borne noise excitation of the energy storage device, etc. Therefore, the maximum electric motor torque may be lowered with a decreasing charge state, an increasing aging state, very high or very low energy storage temperatures and/or a strong structure-borne noise excitation, etc. For this purpose, either corresponding threshold values may be specified, or the electromotive maximum torque may be varied proportionally with the mentioned variables.

If the desired torque is greater than a sum of the consumption-optimized combustion engine maximum torque and the variable electric motor maximum torque, then the combustion engine is operated at a torque which is greater than the consumption-optimized combustion engine maximum torque (but smaller than its consumption-independent maximum torque). For this purpose, it may be provided to adjust at least one operating parameter of the combustion engine with respect to its optimum efficiency setting. In other words, independently of the fuel consumption, the combustion engine has operating parameters applied to it that are optimized for a maximum torque. For this purpose, for example, the ignition angle, injection quantity, injection point, air ratio, control times of the intake and/or outlet valves, etc., may be adjusted. Moreover, it is also possible to adjust parameters that affect the type of the air-fuel charge in the combustion chamber of the engine. For example, the position of a charge movement valve arranged in the intake pipe may be influenced. In the case of compressor engines that have a compressor drive having a variable transmission ratio, the transmission ratio may be increased as long as the maximum rotational speed of the compressor is not exceeded. Since the drive power of the compressor rises disproportionately with the rotational speed, this measure is also not optimal as regards consumption, but it results in a higher torque.

Example embodiments of the present invention related to a hybrid drive unit, which has a torque control system that implements the described method steps. The torque control system may also be integrated into a conventional engine control unit and may exist in the form of a program algorithm for implementing the method.

The combustion engine may be a supercharged engine, which is supplied with compressed charge air via a charge air supercharger, e.g., an exhaust gas turbocharger or a variable compressor.

According to an example embodiment of the present invention, a method for controlling torque of a hybrid drive unit including a combustion engine and at least one electric machine operable alternatively as a motor or a generator, includes: powering the electric machine by an energy storage device to operate the electric machine as a motor and supplying a positive electric motor torque together with a combustion engine torque of the combustion engine to produce a total drive torque of the hybrid drive unit; and if a desired torque is greater than a consumption-optimized combustion engine maximum torque, operating the electric machine as a motor having an electric motor torque. An electric motor maximum torque is predetermined as a function of at least one state parameter of the energy storage device.

A maximum producible total drive torque of the hybrid drive unit, at least in one predetermined rotational speed range, may match a consumption-independent combustion engine maximum torque of the combustion engine.

The predetermined rotational speed range may include rotational speeds above 1,600 rpm.

The predetermined rotational speed range may include rotational speeds above 1,800 rpm.

The predetermined rotational speed range may include rotational speeds above 2,000 rpm.

The electric motor maximum torque may be predetermined as a function of the at least one state parameter such that the electric motor maximum torque decreases with decreasing at least one of (a) charging and (b) discharging capacity of the energy storage device.

The at least one state parameter of the energy storage device may include at least one of (a) a charge state, (b) an aging state, (c) an energy storage device temperature and (d) a structure-borne noise excitation of the energy storage device.

The electric motor maximum torque may lower with at least one of (a) a decreasing charge state of the energy storage device, (b) an increasing aging state of the energy storage device, (c) in the event of one of (i) very high and (ii) very low energy storage device temperatures and (d) strong structure-borne noise excitation.

The combustion engine may be operated having a combustion engine torque greater than the consumption-optimized combustion engine maximum torque if the desired torque is greater than a sum of the consumption-optimized combustion engine maximum torque and the electric motor maximum torque.

The method may include adjusting at least one operating parameter of the combustion engine with respect to an efficiency-optimized setting to operate the combustion engine having a combustion engine torque greater than the consumption-optimized combustion engine maximum torque.

The at least one operating parameter of the combustion engine may include at least one of (a) ignition angle, (b) injection quantity, (c) injection point, (d) air ratio, (e) valve timing, (f) charge-influencing parameters and (g) a transmission ratio of a variable compressor.

According to an example embodiment of the present invention, a hybrid drive unit includes: a combustion engine; at least one electric machine configured to operate alternatively as a motor or as a generator; an energy storage device configured to power the electric machine to operate the electric machine as a motor to supply a positive electric motor torque together with a combustion engine torque of the combustion engine to produce a total drive torque of the hybrid drive unit; and a torque control device configured to operate the electric machine as a motor having an electric motor torque if a desired torque is greater than a consumption-optimized combustion engine torque. An electric motor maximum torque is a function of at least one parameter of the energy storage device.

The combustion engine may include a compressed charge air supply device.

The combustion engine may include at least one of (a) a turbocharger and (b) a compressor.

According to an example embodiment of the present invention, a torque control device includes: an arrangement configured to perform a method for controlling torque of a hybrid drive unit including a combustion engine and at least one electric machine operable alternatively as a motor or a generator. The method includes: powering the electric machine by an energy storage device to operate the electric machine as a motor and supplying a positive electric motor torque together with a combustion engine torque of the combustion engine to produce a total drive torque of the hybrid drive unit; and if a desired torque is greater than a consumption-optimized combustion engine maximum torque, operating the electric machine as a motor having an electric motor torque. An electric motor maximum torque is predetermined as a function of at least one state parameter of the energy storage device.

Example embodiments of the present invention are described in more detail below with reference to the appended Figures.

DETAILED DESCRIPTION

Figure 1:
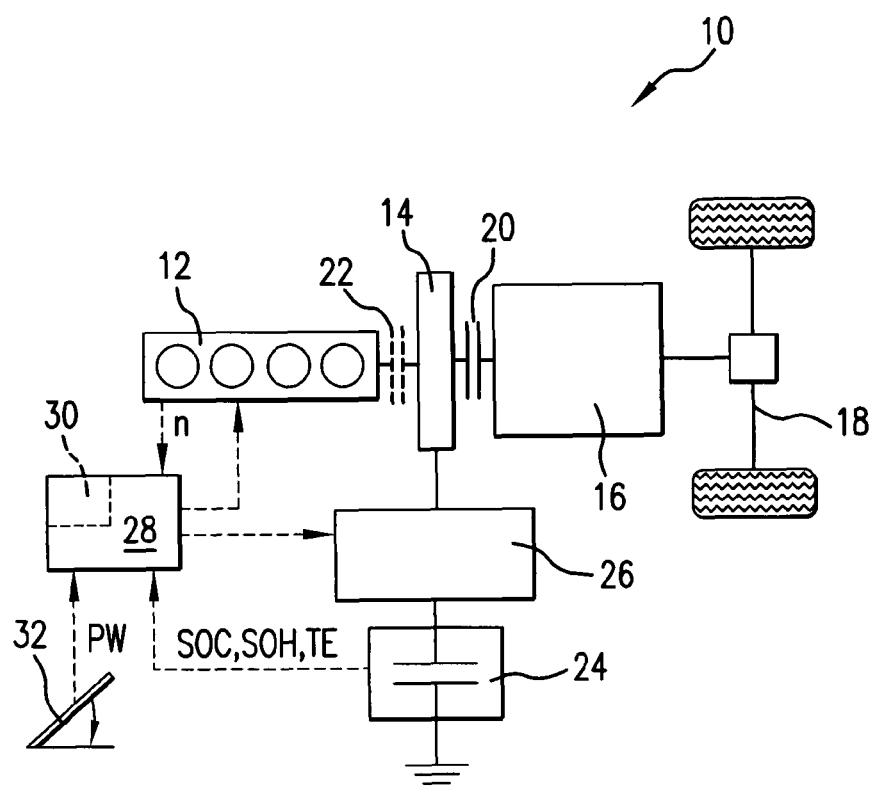
FIG. 1 is a schematic view of the structure of a hybrid drive unit according to an example embodiment of the present invention.

In FIG. 1, reference numeral 10 denotes on the whole a parallel hybrid drive unit of a hybrid vehicle. The vehicle may be driven alternatively or simultaneously by a conventional combustion engine 12 (Otto or diesel engine) and an electric motor 14 (electric machine, e-machine), both of which act on the same shaft, e.g., on the crank shaft of combustion engine 12. Combustion engine 12 is supplied with compressed charge air via a charger, e.g., an exhaust gas turbocharger. Electric motor may be connected to the engine crankshaft in various manners. Thus, electric motor may be connected to the crankshaft directly or via a clutch, or via a belt drive, for example, a toothed belt, or a gear unit or another friction-and/or form-locking connection, etc. Combustion engine 12 and electric motor 14 are connected to an indicated drive train 18 via a transmission 16. The drive shafts of combustion engine 12 or of electric motor are decoupled from transmission 16 via a clutch 20, which may be disengaged by the driver by operating a clutch pedal and which is engaged when the clutch pedal is not operated. Transmission 16 may alternatively take the form of an automatic transmission, in which the operation of clutch 20 is omitted. Furthermore, an optional additional clutch 22 is indicated in FIG. 1, which may be arranged between combustion engine 12 and electric motor 14. Such an additional clutch 22 allows for the separate decoupling of combustion engine 12 from drive train 18 or from electric motor 14, which provides that its mechanical friction resistances need not be dragged along when combustion engine 12 is switched off. Additional clutch 22 thus results in an additional potential for saving fuel, although it involves an additional expenditure in terms of costs, construction and space. The presently described method may be applied to hybrid drives that have and those that do not have additional clutch 22.

Electric motor 14, which is, for example, a three-phase current asynchronous motor or a three-phase current synchronous motor, may be operated alternatively as a motor having a positive or as a generator having a negative electric motor torque M_EM. When operated as a motor, electric motor 14 drives drive train 18—alone or supporting the combustion engine torque M_VM of combustion engine 12—using electrical energy (current). Electric motor 14 obtains the latter from an energy storage device 24, which may be, for example, a battery and/or a capacitor storage device. When operated as a generator, by contrast, electric motor is driven by combustion engine 12 or by an overrun of the vehicle and converts the kinetic energy into electrical energy for charging energy storage device 24 or for supplying a vehicle electric system. Electric motor 14 is switched between motor and generator operation by power electronics 26, which at the same time performs a possibly required conversion between direct and alternating current.

The vehicle is driven predominantly by combustion engine 12, which is started by electric motor 14 configured as a starter generator. In addition, electric motor 14 assumes a boost function in that it is switched on in high load situations, e.g., when the vehicle accelerates, to support the vehicle drive (motor operation). On the other hand, in driving situations where there is an excess of kinetic energy of the vehicle, electric motor 14 has a so-called recuperating function in that, by operating as a generator, it converts the energy of motion into kinetic energy for charging energy storage device 24 and thus simultaneously provides a brake torque. An electric motor 14 particularly suitable in this connection has a power output of at most, e.g., 50 kW, e.g., of at most 30 kW, e.g., in the range of 15 to 25 kW, e.g., of approximately 20 kW.

In this instance, the operation of combustion engine 12 and of power electronics 26 is controlled by an engine control unit 28, into which a torque control (indicated by reference numeral 30) is integrated in the form of a program algorithm. Alternatively, torque control 30 may also be provided in a separate control unit. Various current operating parameters of the vehicle are input into engine control unit 28. For example, a crankshaft speed n and a pedal value PW of a pedal travel sensor indicated by 32 are supplied to control unit 28. Pedal value PW represents the position of the accelerator pedal, e.g., the extent to which the driver operates the accelerator pedal. Furthermore, engine control unit 28 receives or ascertains information characterizing a charge state SOC (state-of-charge), an aging state SOH (state-of-health) and a storage temperature TE of energy storage device 24. Moreover, a structure-borne noise excitation of energy storage device 24 may also be ascertained via suitable sensors and supplied to control unit 28.

As a function of pedal value PW and current rotational speed n, torque control 30 ascertains a current desired torque M_W from stored characteristics maps and accordingly controls both combustion engine torque M_VM of combustion engine 12 as well as electric motor torque M_EM of electric motor 14. An arrangement such that that illustrated with reference to FIGS. 2 and 3, is used, e.g., in phases, in which the demanded desired torque M_W exceeds a current total drive torque M_H of hybrid drive unit 10, e.g., when there are load demands and, e.g., full load demands such as in acceleration situations.

Figure 2:
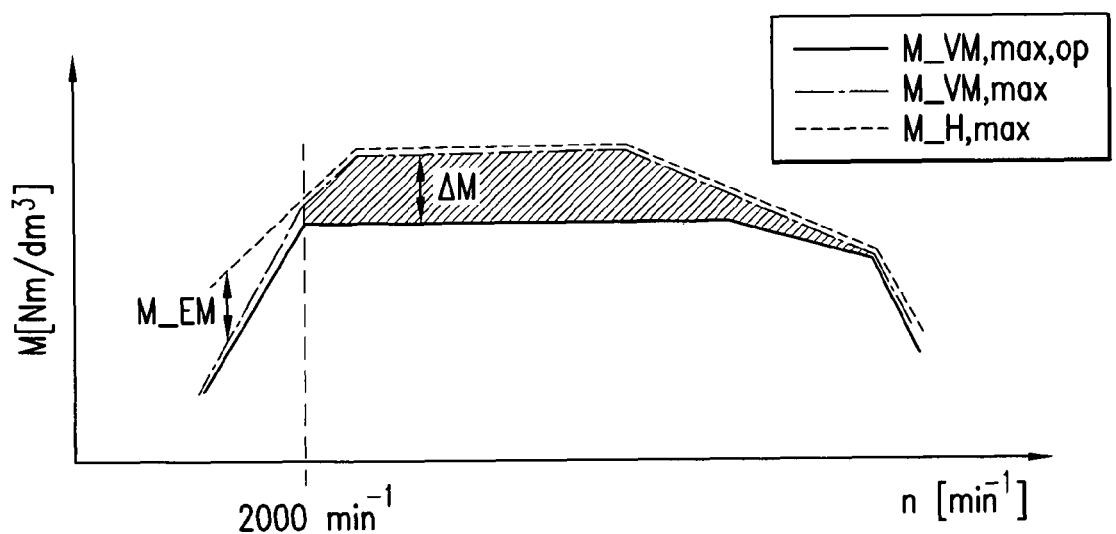
FIG. 2 illustrates characteristic curves of combustion engine torques and of a total drive torque of a hybrid drive as illustrated in FIG. 1.
Figure 3:
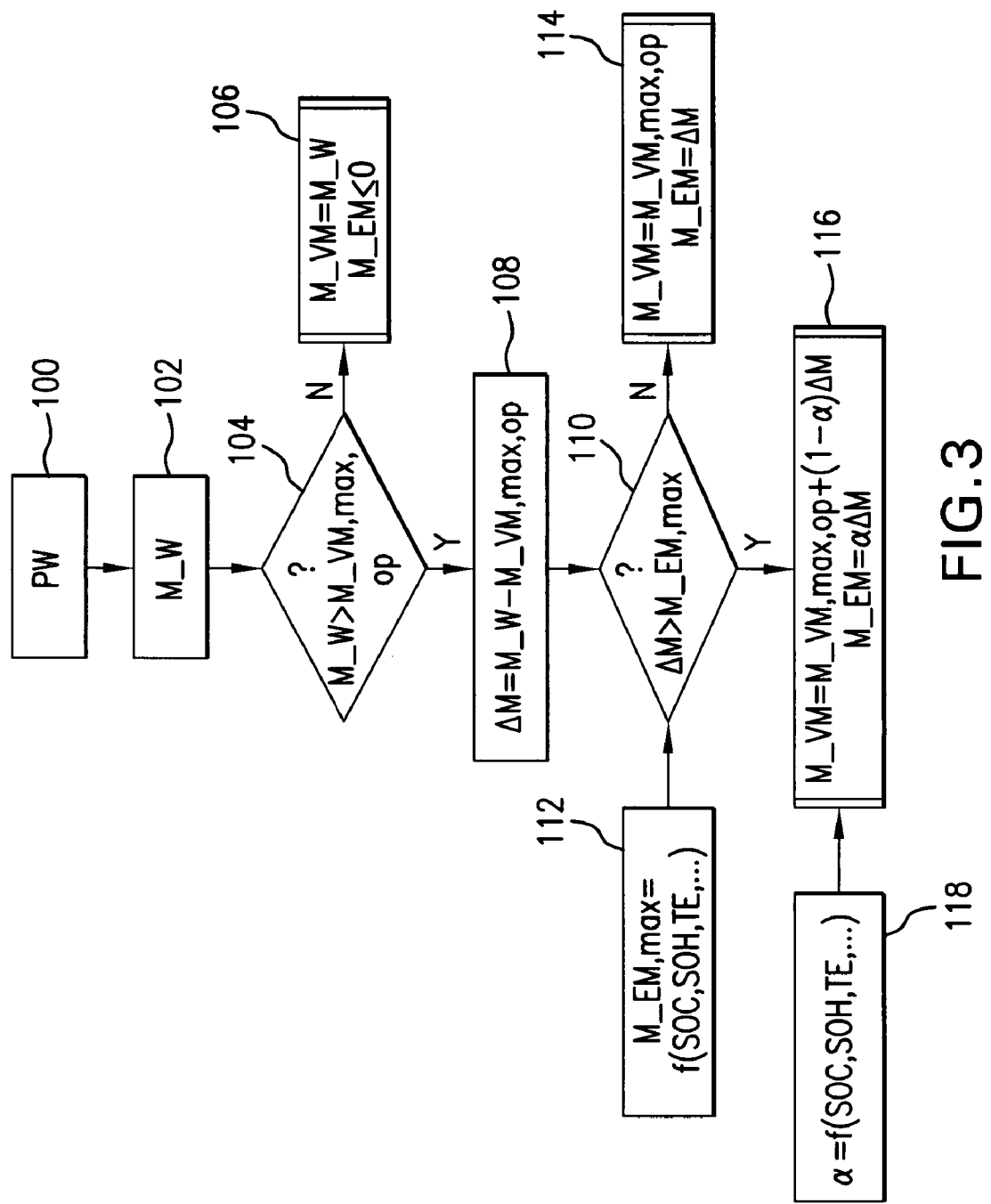
FIG. 3 is a flow chart illustrating a procedure for controlling the torque of a hybrid drive as illustrated in FIG. 1.

FIG. 2 illustrates the principle hereof with reference to rotational speed-dependent characteristic curves of the specific (displacement-specific) torque M of the combustion engine and of the hybrid drive as a whole. The solid line represents the consumption-optimized combustion engine maximum torque M_VM,max,op. As already explained above, this is the maximum torque producible by combustion engine 12 alone when the latter has operating parameters applied to it that are configured for optimal efficiency and fuel consumption. The relatively low specific torques at low rotational speeds n are typical for a turbocharged combustion engine. The reason for this is that at low rotational speeds the exhaust gas mass flows are insufficient to compress the intake air appropriately. In the medium rotational speed range (e.g., 2,000 rpm), by contrast, high specific torques are achieved.

The dashed characteristic curve illustrates the consumption-independent combustion engine maximum torque that may be achieved if combustion engine 12 has parameters applied to it in terms of a maximum torque (M_VM,max) without consideration of the fuel consumption. As illustrated, the consumption-optimized and the consumption-ignoring maximum torques hardly deviate from each other in the low rotational speed range, e.g., below 2,000 rpm, while, e.g., above 2,000 rpm the maximum achievable torque may be increased by, e.g., approximately 10% to 15% if the combustion engine is operated in a consumption-ignoring manner. This torque difference $\Delta M$ may be produced by adjusting various operating parameters of the combustion engine that are adjusted to improve power while accepting increased consumptions. In this sense, it is possible to influence, for example, the ignition angle, the injection quantity and thus also the air ratio, injection point and injection duration, valve control times as well as parameters that influence a mixture charge, etc. In the case of a supercharged combustion engine 12 having a variable compressor, it is possible to increase the transmission ratio of the compressor transmission.

At least in the medium rotational speed range, for example, above 2,000 rpm, it is provided that a total torque maximally producible by hybrid drive 10, that is, from the sum of the combustion engine torque and the electric motor torque, is configured in accordance with the maximum torque M_VM,max achievable by combustion engine 12 alone without regard to consumption. Accordingly, e.g., above 2,000 rpm, the maximum total torque M_H,max of hybrid drive unit 10 exhibits a practically identical characteristic curve as consumption-independent combustion engine maximum torque M_VM,max. Below the rotational speed threshold, by contrast, the maximum producible total torque M_H,max is above combustion engine maximum torque M_VM,max. This difference in the low rotational speed ranges (turbo lag) is filled by electric motor torque M_EM alone. According to example embodiments of the present invention, the torque difference $\Delta M$ in the medium and high rotational speed range, by contrast, is produced in a variable manner either by e-machine 14 alone or by combustion engine 12 alone or proportionally by both. For example, the maximum torque M_EM,max producible by the e-machine is predetermined as a function of various state parameters of energy storage device 24. Given an optimum state of energy storage device 24 and thus the greatest possible charging and discharging capacities of the same, the differential torque $\Delta M$ may be produced entirely by e-machine 14. In the other extreme case, e.g., when energy storage device 24 is in its worst possible state, the differential torque $\Delta M$ is produced by combustion engine 12 alone, which in this instance is operated at its consumption-ignoring maximum torque M_VM,max. If energy storage device 24, by contrast, exhibits a medium state having medium charging and discharging capacities, then the differential torque $\Delta M$ is generated from a mix of combustion engine torque M_VM and electric motor torque M_EM, a proportionality factor a being specified as a function of the state parameters of energy storage device 24.

Controlling the sum torque in hybrid vehicles as described herein may ensure that the maximum predetermined torque M_H,max may always be guaranteed. This results in a very reproducible, agreeable and safe vehicle performance. On the other hand, maximum power outputs at the lowest possible fuel consumption may be ensured because the differential torque $\Delta M$ is, if possible, always provided entirely by electric machine 14 such that combustion engine 12 may be operated in its consumption-optimized sense, e.g., when the electrical energy was previously obtained through recuperation or when the energy storage device has a very high charge state SOC.

FIG. 3 schematically illustrates an exemplary sequence for controlling the electric motor torque and the combustion engine torque. The method starts in block 100, where the pedal value PW of pedal travel sensor 32 (see, e.g., FIG. 1) is read into torque control 30 of engine control unit 28. A demanded desired torque M_W is ascertained from this in block 102. For this purpose, characteristics maps are used, e.g., in a conventional manner, which are stored in engine control unit 28.

Subsequently, the method proceeds to block 104, where a query is made as to whether the desired torque M_W is greater than the consumption-optimized combustion engine maximum torque M_VM,max,op. If this query is answered in the negative, e.g., the load demand is below the consumption-optimized maximum torque M_VM,max,op, then the method proceeds to block 106. In block 106, combustion engine torque M_VM is set in accordance with desired torque MW, while electric motor torque M_EM is set to 0. In other words, e-machine 14 is switched off (or operated as a generator) and desired torque EM is provided solely by combustion engine 12 having consumption-optimized parameters applied to it.

On the other hand, if the query in block 104 is answered in the positive, e.g., if desired torque W_MW is greater than consumption-optimized combustion engine maximum torque M_VM,max,op, then the method proceeds to block 108, where the differential torque $\Delta M$ is calculated from the difference between the demanded desired torque M_W and the consumption-optimized maximum torque M_VM,max. In block 110, a query is made as to whether differential torque $\Delta M$ exceeds electric motor maximum torque M_EM,max. For this purpose, electric motor maximum torque M_EM,max is read in as a function of state parameters of energy storage device 24, e.g., charge state SOC, aging state SOH, temperature TE and others, etc. The electric motor maximum torque may be predetermined either in an independent routine or integrated into the sequence illustrated in FIG. 3.

If the query in block 110 is answered in the negative, e.g., if differential torque ΔM is smaller than or equal to electric motor maximum torque M_EM,max, then the method proceeds to block 114, where combustion engine torque M_VM is set to consumption-optimized maximum torque M_VM, max,op and electric motor torque M_EM is set to differential torque ΔM. Thus, in this instance, the differential torque ΔM that exceeds the consumption-optimized operation of the combustion engine is produced by e-motor 14 alone.

By contrast, if the query in block 110 is answered in the positive, e.g., if differential torque ΔM exceeds electric motor maximum torque M_EM,max, then the method proceeds to block 116. In block 116, electric motor torque M_EM is determined as the product of the proportional factor α (where α=0 . . . 1) and differential torque ΔM. Furthermore, combustion engine torque M_VM is formed as the sum of the electric motor maximum torque and the product of proportionality factor 1−α and differential torque ΔM. For this purpose, the combustion engine torque and the electric motor torque are limited to the respective maximum torques. As a result, combustion engine torque M_VM may assume values between M_VM,max,op and M_VM,max, while electric motor torque M_EM may assume values between 0 (in a worst possible state of the storage device) and electric motor maximum torque M_EM,max (in a best state of the storage device). Proportionality factor α is ascertained as a function of the state parameters of energy storage device 24 from block 118.

| LIST OF REFERENCE SYMBOLS | |
|---|---|
| 10 | hybrid drive unit |
| 12 | combustion engine |
| 14 | electric machine |
| 16 | transmission |
| 18 | drive train |
| 20 | clutch |
| 22 | additional clutch |
| 24 | energy storage device/battery |
| 26 | power electronics |
| 28 | engine control unit |
| 30 | torque control |
| 32 | pedal travel sensor |
| n | rotational speed |
| PW | pedal value |
| M-EM | electric motor torque |
| M_EM, max | electric motor maximum torque |
| M_VM | combustion engine torque |
| M_VM, max | consumption-independent (= consumption-ignoring) combustion engine maximum torque |
| M_VM, max, op | consumption-optimized combustion engine maximum torque |
| M_H | total drive torque of the hybrid drive |
| M_H, max | maximum total drive torque |
| M_W | demanded desired torque |
| ΔM | differential torque between M_W and M_VM, max, op |
| α | proportionality factor |
| TE | energy storage device temperature |

What is claimed is:

1. A method for controlling torque of a hybrid drive unit including a combustion engine and at least one electric machine operable alternatively as a motor or a generator, comprising:
powering the electric machine by an energy storage device to operate the electric machine as a motor and supplying a positive electric motor torque together with a combustion engine torque of the combustion engine to produce a total drive torque of the hybrid drive unit;
determining an electric motor maximum torque as a function of at least one state parameter of the energy storage device; and
if a desired torque is greater than a consumption-optimized combustion engine maximum torque, operating the electric machine as a motor having an electric motor torque that does not exceed the determined electric motor maximum torque;
wherein the combustion engine is operated having a combustion engine torque greater than the consumption-optimized combustion engine maximum torque if the desired torque is greater than a sum of the consumption-optimized combustion engine maximum torque and the electric motor maximum torque.

2. The method according to claim 1, wherein a maximum producible total drive torque of the hybrid drive unit, at least in one predetermined rotational speed range, matches a consumption-independent combustion engine maximum torque of the combustion engine.

3. The method according to claim 2, wherein the predetermined rotational speed range includes rotational speeds above 1,600 rpm.

4. The method according to claim 2, wherein the predetermined rotational speed range includes rotational speeds above 1,800 rpm.

5. The method according to claim 2, wherein the predetermined rotational speed range includes rotational speeds above 2,000 rpm.

6. The method according to claim 1, wherein the electric motor maximum torque is predetermined as a function of the at least one state parameter such that the electric motor maximum torque decreases with decreasing at least one of (a) charging and (b) discharging capacity of the energy storage device.

7. The method according to claim 1, wherein the at least one state parameter of the energy storage device includes at least one of (a) a charge state, (b) an aging state, (c) an energy storage device temperature and (d) a structure-borne noise excitation of the energy storage device.

8. The method according to claim 6, wherein the electric motor maximum torque lowers with at least one of (a) a decreasing charge state of the energy storage device, (b) an increasing aging state of the energy storage device, (c) in the event of one of (i) very high and (ii) very low energy storage device temperatures and (d) strong structure-borne noise excitation.

9. The method according to claim 1, further comprising adjusting at least one operating parameter of the combustion engine with respect to an efficiency-optimized setting to operate the combustion engine having a combustion engine torque greater than the consumption-optimized combustion engine maximum torque.

10. The method according to claim 9, wherein the at least one operating parameter of the combustion engine includes at least one of (a) ignition angle, (b) injection quantity, (c) injection point, (d) air ratio, (e) valve timing, (f) charge-influencing parameters and (g) a transmission ratio of a variable compressor.

11. A hybrid drive unit, comprising:
a combustion engine;
at least one electric machine configured to operate alternatively as a motor or as a generator;

an energy storage device configured to power the electric machine to operate the electric machine as a motor to supply a positive electric motor torque together with a combustion engine torque of the combustion engine to produce a total drive torque of the hybrid drive unit; and a torque control device configured to determine an electric motor maximum torque as a function of at least one state parameter of the energy storage device and to operate the electric machine as a motor having an electric motor torque that does not exceed the determined electric motor maximum torque if a desired torque is greater than a consumption-optimized combustion engine maximum torque;

wherein the torque control device is configured to operate the combustion engine having a combustion engine torque greater than the consumption-optimized combustion engine maximum torque if the desired torque is greater than a sum of the consumption-optimized combustion engine maximum torque and the electric motor maximum torque.

12. The hybrid drive unit according to claim 11, wherein the combustion engine includes a compressed charge air supply device.

13. The hybrid drive unit according to claim 11, wherein the combustion engine includes at least one of (a) a turbocharger and (b) a compressor.

14. A torque control device, comprising:

an arrangement configured to perform a method for controlling torque of a hybrid drive unit including a combustion engine and at least one electric machine operable alternatively as a motor or a generator, the method including:

powering the electric machine by an energy storage device to operate the electric machine as a motor and supplying a positive electric motor torque together with a combustion engine torque of the combustion engine to produce a total drive torque of the hybrid drive unit;

determining an electric motor maximum torque as a function of at least one state parameter of the energy storage device; and if a desired torque is greater than a consumption-optimized combustion engine maximum torque, operating the electric machine as a motor having an electric motor torque that does not exceed the determined electric motor maximum torque;

wherein the combustion engine is operated having a combustion engine torque greater than the consumption-optimized combustion engine maximum torque if the desired torque is greater than a sum of the consumption-optimized combustion engine maximum torque and the electric motor maximum torque.

* * * * *